(12) United States Patent
Kim et al.

(10) Patent No.: US 10,325,566 B2
(45) Date of Patent: Jun. 18, 2019

(54) TOUCH DEVICE DETECTING MUTUAL CAPACITANCE AND SELF CAPACITANCE AND DRIVING METHOD THEREOF

(71) Applicant: Samsung Display Co., Ltd., Yongin-si (KR)

(72) Inventors: Ji Woong Kim, Suwon-si (KR); Jun Yong Song, Hwaseong-si (KR); Choong Sun Shin, Yongin-si (KR)

(73) Assignee: Samsung Display Co., Ltd, Yongin-si (KR)

( * ) Notice: Subject to any disclaimer, the term of this patent is extended or adjusted under 35 U.S.C. 154(b) by 29 days.

(21) Appl. No.: 14/837,549

(22) Filed: Aug. 27, 2015

(65) Prior Publication Data
US 2016/0209953 A1 Jul. 21, 2016

(30) Foreign Application Priority Data
Jan. 16, 2015 (KR) .......................... 10-2015-0008162

(51) Int. Cl.
G09G 5/00 (2006.01)
G06F 3/041 (2006.01)

(52) U.S. Cl.
CPC ........... G09G 5/003 (2013.01); G06F 3/0416 (2013.01)

(58) Field of Classification Search
None
See application file for complete search history.

(56) References Cited

U.S. PATENT DOCUMENTS

| | | | |
|---|---|---|---|
| 8,933,907 B2 | 1/2015 | Hanauer et al. | |
| 2011/0007021 A1* | 1/2011 | Bernstein | G06F 3/0416 345/174 |
| 2011/0175835 A1 | 7/2011 | Wang | |
| 2011/0205172 A1* | 8/2011 | Kitada | G06F 3/044 345/173 |
| 2011/0267309 A1* | 11/2011 | Hanauer | G06F 3/0416 345/174 |
| 2012/0050180 A1* | 3/2012 | King | G06F 3/0416 345/173 |

(Continued)

FOREIGN PATENT DOCUMENTS

KR 10-1124713 3/2012
KR 10-2012-0095443 8/2012

(Continued)

*Primary Examiner* — David D Davis
(74) *Attorney, Agent, or Firm* — H.C. Park & Associates, PLC

(57) ABSTRACT

A touch device includes first and second electrodes intersecting each other, and a touch controller. The touch controller is configured to: apply a first driving signal to the first electrodes; selectively apply a second driving signal to the second electrodes; and detect self capacitances of at least one of the first electrodes and a first portion of the second electrodes intersecting the first electrodes. The at least one of the first electrodes is configured to receive the first driving signal, and the first portion of the second electrodes is configured to receive the second driving signal. The touch controller is further configured to detect mutual capacitances between the at least one of the first electrodes and a second portion of the second electrodes intersecting the first electrodes, in which the second portion of the second electrodes is configured not to receive the second driving signal.

15 Claims, 17 Drawing Sheets

(56) References Cited

U.S. PATENT DOCUMENTS

| | | | | |
|---|---|---|---|---|
| 2013/0176277 A1* | 7/2013 | Wang | ................... | G06F 3/044 345/174 |
| 2013/0215047 A1 | 8/2013 | Wu et al. | | |
| 2013/0285975 A1* | 10/2013 | Hong | ................... | G06F 3/044 345/174 |
| 2014/0152609 A1* | 6/2014 | Kim | ................... | G06F 3/0418 345/174 |
| 2014/0253499 A1* | 9/2014 | Lee | ................... | G06F 3/044 345/174 |
| 2014/0283019 A1* | 9/2014 | Sato | ................... | G06F 21/36 726/19 |
| 2015/0002176 A1* | 1/2015 | Kwon | ................... | G06F 3/0416 324/679 |
| 2015/0049044 A1* | 2/2015 | Yousefpor | ................... | G06F 3/044 345/174 |
| 2015/0123923 A1* | 5/2015 | Stern | ................... | G06F 3/0418 345/173 |
| 2015/0199065 A1 | 7/2015 | Ahn | | |
| 2015/0317008 A1* | 11/2015 | Chandran | ................... | G06F 3/044 345/174 |
| 2016/0299680 A1* | 10/2016 | Polyulya | ................... | G06F 3/0488 |

FOREIGN PATENT DOCUMENTS

| KR | 10-2013-0075721 | 7/2013 |
|---|---|---|
| KR | 10-1281018 | 7/2013 |
| KR | 10-2013-0124191 | 11/2013 |

\* cited by examiner

● : TOUCH

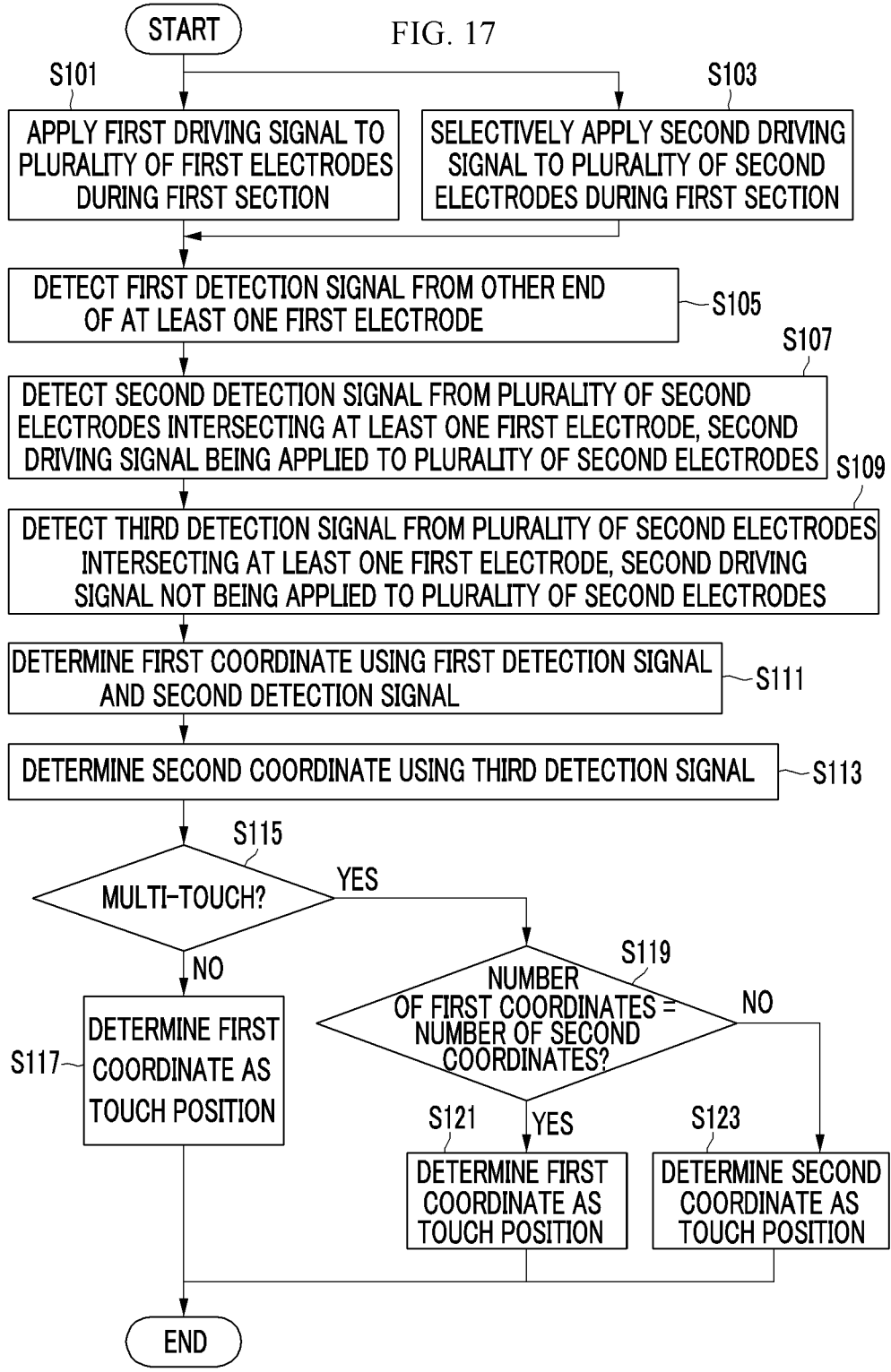

TOUCH DEVICE DETECTING MUTUAL CAPACITANCE AND SELF CAPACITANCE AND DRIVING METHOD THEREOF

CROSS-REFERENCE TO RELATED APPLICATION

This application claims priority from and the benefit of Korean Patent Application No. 10-2015-0008162, filed on Jan. 16, 2015, which is hereby incorporated by reference for all purposes as if fully set forth herein.

BACKGROUND

Field

Exemplary embodiments of the present invention relate to a touch device and a driving method thereof.

Discussion of the Background

Display devices such as a liquid crystal display (LCD), an organic light emitting diode (OLED) display, and an electrophoretic display may include a field generating electrode and an electro-optical active layer. The OLED display may include an organic emission layer as the electro-optical active layer. The field generating electrode may be connected to a switching element such as a thin-film transistor to receive a data signal, and the electro-optical active layer may convert the data signal into an optical signal to display an image. A display device may include a touch sensing function which may interact with a user in addition to an image displaying function. The touch sensing function may determine contact information such as whether an object contacts or approaches a screen and a contact position thereof by sensing a change in pressure, charges, light, and the like, which are applied onto the screen in the display device, when the user writes a text or draws a figure by contacting or approaching the screen with a finger or a touch pen.

The display device may receive an image signal based on the contact information to display an image. The touch sensing function may be implemented by a touch sensor. The touch sensor may be classified according to various types, such as a resistive type, a capacitive type, an electro-magnetic (EM) type, and an optical type. The capacitive type touch sensor may include a sensing condenser including sensing electrodes that may transfer a sensing signal and identify whether a touch exists or a touch location by sensing a change in charged capacitance or a change in the amount of charged charges of the sensing condenser, which may occur when a conductor such as a finger approaches the touch sensor. A display device incorporating the touch sensor has been recently researched.

A capacitance method includes a self capacitance method and a mutual capacitance method. In the self capacitance method, a capacitance is detected by applying a voltage to each of touch sensor electrodes and measuring a resulting voltage change. In the mutual capacitance method, a capacitance is detected by applying a voltage in an x-axis direction and detecting a voltage induced in a y-axis direction intersecting the x-axis direction.

The self capacitance method may have high sensitivity, and thus may provide a hovering function. However, due to an unexpected touch phenomenon, i.e., a ghost point may occur during a multi-touch, which may render performing the touch sensing operation difficult.

The mutual capacitance method may have lower sensitivity than the self capacitance method, but a multi-touch operation may be possible. However, since the mutual capacitance method has low sensitivity, a sensitive function such as hovering may be limited.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the present invention provide a touch device and a driving method thereof having touch sensing method in which a self capacitance method and a mutual capacitance method are combined.

Additional aspects will be set forth in the detailed description which follows, and, in part, will be apparent from the disclosure, or may be learned by practice of the inventive concept.

According to exemplary embodiments, a touch device includes first electrodes, second electrodes intersecting the first electrodes, and a touch controller. The touch controller is configured to: apply a first driving signal to first ends of the first electrodes; selectively apply a second driving signal to the second electrodes; and detect self capacitances of at least one of the first electrodes and a first portion of the second electrodes intersecting the at least one of the first electrodes. The at least one of the first electrodes is configured to receive the first driving signal, and the first portion of the second electrodes is configured to receive the second driving signal. The touch controller is further configured to detect mutual capacitances between the at least one of the first electrodes and a second portion of the second electrodes intersecting the at least one of the first electrodes, in which the second portion of the second electrodes is configured not to receive the second driving signal.

The touch controller may include: a self capacitance detection unit configured to receive a first detection signal from a second end of the at least one of the first electrodes and receive a second detection signal from the first portion of the second electrodes; a mutual capacitance detection unit configured to receive a third detection signal from the second portion of the second electrodes; and a touch recognition unit configured to determine a second coordinate as a touch position, when at least one first coordinate determined using the first detection signal and the second detection signal does not coincide with at least one second coordinate determined using the third detection signal.

The touch recognition unit may be configured to: determine whether a touch is a single touch or a multi-touch based on the first detection signal, the second detection signal, and the third detection signal; compare the number of first coordinates with the number of second coordinates when the touch is determined to be the multi-touch; determine the first coordinate as the touch position when the numbers of the first and second coordinates are the same; and determine the second coordinate as a touch position when the numbers of the first and second coordinates are not the same.

The touch recognition unit may be configured to determine the first coordinate as the touch position when the touch is determined to be the single touch.

The first driving signal may include a first pulse signal and a second pulse signal, the second driving signal may include the first pulse signal. The self capacitance detection unit may be configured to receive the first detection signal and the second detection signal while the first pulse signal is supplied, and the mutual capacitance detection unit may be configured to receive the third detection signal while the second pulse signal is supplied.

The touch controller may further include a driving unit configured to: sequentially apply the first pulse signal and the second pulse signal to the first ends of the first electrodes during a first section; and selectively apply the first pulse signal to first ends of the second electrodes during the first section.

The driving unit may be configured to: switch the first pulse signal and the second pulse signal; sequentially apply the first and second pulse signals to the first ends of the first electrodes during the first section; and may alternately switch the second electrodes to which the first pulse signal is applied during the first section.

According to an exemplary embodiment of the present invention, a driving method of a touch device including first electrodes, second electrodes intersecting the first electrodes, and a touch controller configured to detect a touch by detecting capacitances of the first electrodes and the second electrodes includes the steps of: applying a first driving signal to first ends of the first electrodes; selectively applying a second driving signal to the second electrodes; detecting self capacitances of at least one of the first electrodes and a first portion of the second electrodes intersecting the at least one of the first electrodes, in which the at least one of the first electrodes receives the first driving signal and the first portion of the second electrodes receives the second driving signal; and detecting mutual capacitances between the at least one the first electrodes and a second portion of the second electrodes intersecting the at least one of the first electrodes, in which the second portion of the second electrodes does not receive the second driving signal.

The step of detecting the self capacitances may include receiving a first detection signal from the a second end of the at least one of the first electrodes, and receiving a second detection signal from the first portion of the second electrodes. The step of detecting the mutual capacitances may include receiving a third detection signal from the second portion of the second electrodes. The driving method may further include the step of detecting a touch position using at least one first coordinate determined using the first detection signal and the second detection signal and at least one second coordinate determined using the third detection signal, after detecting of the mutual capacitances.

The step of recognizing the touch position may include: determining whether a touch is a single touch or a multi-touch based on the first detection signal, the second detection signal, and the third detection signal; determining the first coordinate using the first detection signal and the second detection signal as a touch position when the touch is determined to be the single touch; and determining the touch position based on a comparison result of first coordinates to second coordinates when the touch is determined to be the multi-touch.

The step of determining the touch position based on the comparison result may include: comparing the number of the first coordinates with the number of the second coordinates to determine whether the numbers are the same; determining the first coordinate as the touch position when the numbers are the same; and determining the second coordinate as the touch position when the numbers are not the same.

The step of applying the first driving signal may include sequentially applying the first pulse signal and the second pulse signal during a first section, the step of applying the second driving signal may include applying the first pulse signal during the first section, the step of detecting the self capacitances may include receiving the first detection signal and the second detection signal while the first pulse signal is supplied, and the step of detecting the mutual capacitances may include receiving the third detection signal while the second pulse signal is supplied.

The step of sequentially applying the first pulse signal and the second pulse signal may include alternately switching an order of the first pulse signal and the second pulse signal and sequentially applying the first pulse signal and the second pulse signal. The step of applying the first pulse signal during the first section may include alternately switching the second electrodes to which the first pulse signal is applied, to apply the first pulse signal to the second electrodes among the second electrodes.

The first portion of the second electrodes may include a driving electrode Tx, and the second portion of the second electrodes may include a sensing electrode Rx.

According to exemplary embodiments of the present invention, the touch device may provide a highly sensitive combined touch recognition system that includes high sensitivity of a self capacitance method and uses multi-touch sensing of a mutual capacitance method.

Since the self capacitance sensing method and the mutual capacitance sensing method are simultaneously implemented, the touch sensor according to the exemplary embodiment of the present invention may have increased touch sensitivity that may provide a hovering function of the self capacitance sensing method that has high sensitivity and a multi-touch function of the mutual capacitance sensing method.

According to the exemplary embodiments of the present invention, the self capacitance sensing method and the mutual capacitance sensing method may be switched and used in one electrode, and the self capacitance sensing method and the mutual capacitance sensing method may be switched and simultaneously used in a driving electrode and a sensing electrode. In addition, during a single touch operation or a multi-touch operation performed on a same line may provide high touch sensitivity, because sensing is first performed using a self capacitance sensing method having high sensitivity and a mutual capacitance sensing method when a ghost point may be generated.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIG. 17 is a flowchart showing a driving method of a touch device according to an exemplary embodiment of the present invention.

DETAILED DESCRIPTION OF THE ILLUSTRATED EMBODIMENTS

Figure 1:
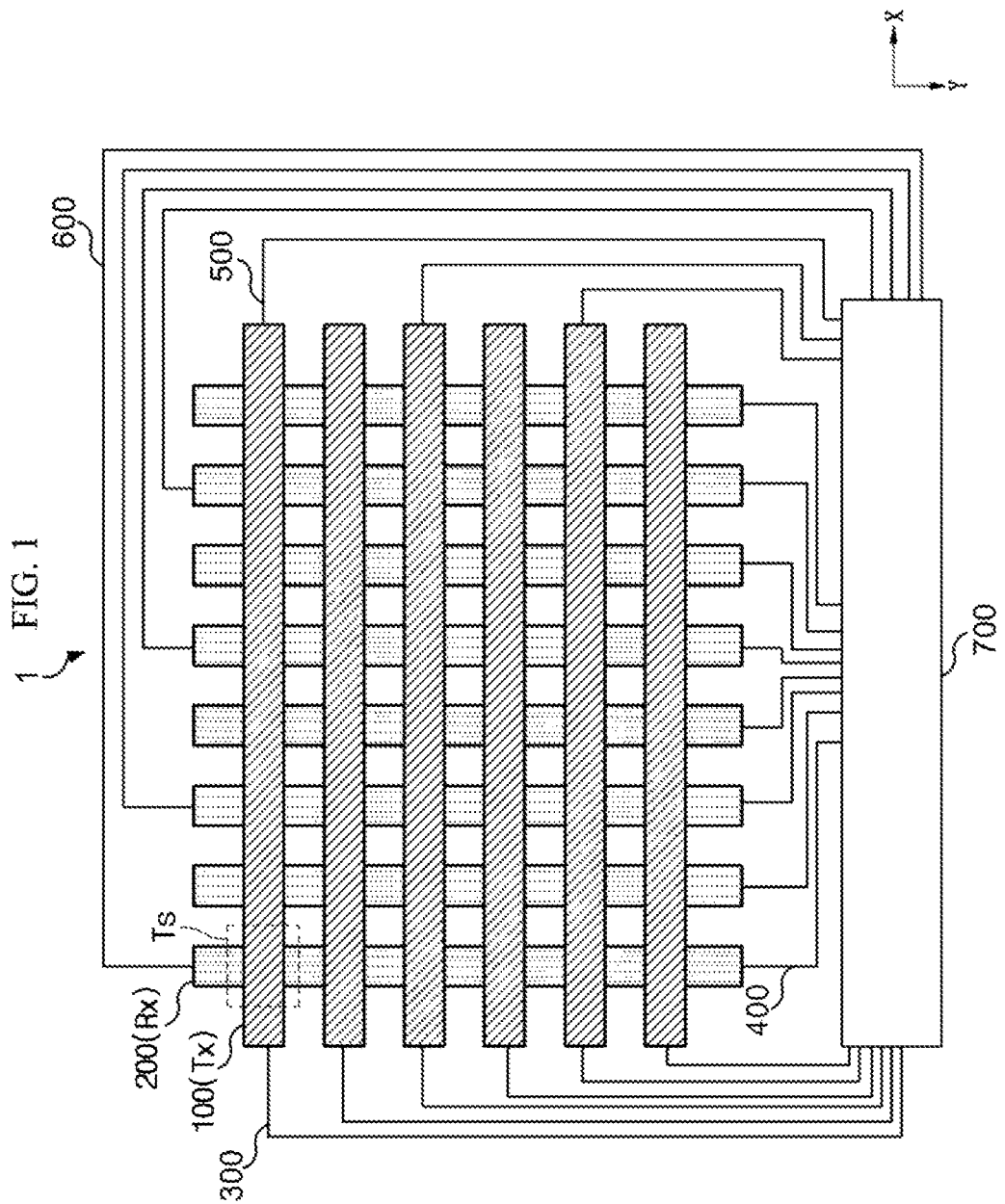
FIG. 1 shows a touch device according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 shows a touch device according to an exemplary embodiment of the present invention.

Referring to FIG. 1, a touch device 1 includes first electrodes 100, second electrodes 200, first wirings 300, second wirings 400, third wirings 500, fourth wirings 600, and a touch controller 700.

The first electrodes 100 and the second electrodes 200 are disposed to intersect each other. One touch sensor TS is formed at a portion at which each of the first electrodes 100 intersects each of the second electrodes 200.

The first electrodes 100 may be N (N is a natural number) electrodes that extend in a first direction, e.g., an X-axis direction and arranged in a second direction, e.g., a Y-axis direction, intersecting the first direction. The second electrodes 200 may be N electrodes that extend in the Y-axis direction and arranged in the first direction intersecting the second direction.

The first electrodes 100 may be driving electrodes Tx that are alternately driven by self capacitances and mutual capacitances when a first driving signal is applied. In the second electrodes 200, driving electrodes Tx to which a second driving signal is applied and sensing electrodes Rx to which the second driving signal is not applied may be alternately disposed.

The first wirings 300 connect one ends of the first electrodes 100 to the touch controller 700 and output the first driving signal to the first electrodes 100.

The second wirings 400 connect one ends of the second electrodes 200 to the touch controller 700. The second wirings 400 selectively output the second driving signal to the second electrodes 200 operating as the driving electrodes Tx among the second electrodes 200.

The third wirings 500 connect the other ends of the first electrodes 100 to the touch controller 700. The third wirings 500 input a first detection signal output from the other ends of the first electrodes 100 to the touch controller 700.

The fourth wirings 600 connect the second electrodes 200 to the touch controller 700. The fourth wirings 600 transfer a second detection signal output from the second electrodes 200 intersecting the first electrodes 100 and operating as the driving electrodes Tx to the touch controller 700. Further, the fourth wirings 600 transfer a third detection signal output from the second electrodes 200 intersecting the first electrodes 100 and operating as the sensing electrodes Rx to the touch controller 700.

The touch controller 700 applies the first driving signal to the one ends of the first electrodes 100. The touch controller 700 selectively applies the second driving signal to the second electrodes 200.

The touch controller 700 detects self capacitances of at least one of the first electrodes 100 and the second electrodes 200 intersecting the at least one first electrode 100 and operating as the driving electrodes Tx. Also the touch controller 700 detects mutual capacitances between the at least one first electrode 100 and the second electrodes 200 intersecting the at least one first electrode 100 and operating as the sensing electrodes Rx.

Figure 2:
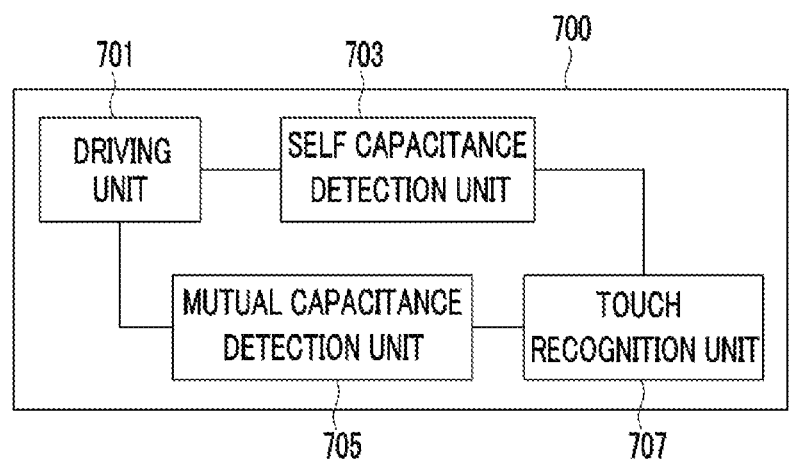
FIG. 2 is a block diagram of a detailed configuration of a touch controller of FIG. 1.

The touch controller 700 may have a configuration as illustrated in FIG. 2.

Figure 3:
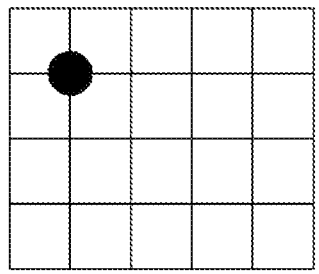
FIG. 3 shows a single touch according to an exemplary embodiment of the present invention.
Figure 4:
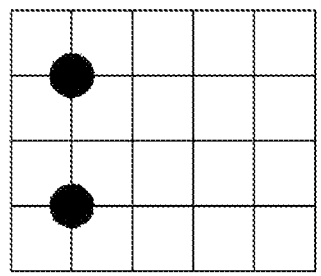
FIG. 4 shows a multi-touch according to an exemplary embodiment of the present invention.
Figure 5:
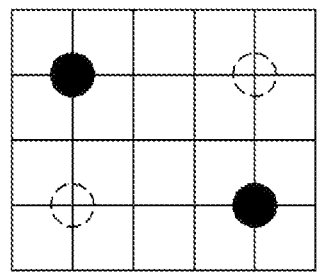
FIG. 5 shows a multi-touch according to an exemplary embodiment of the present invention.
Figure 6:
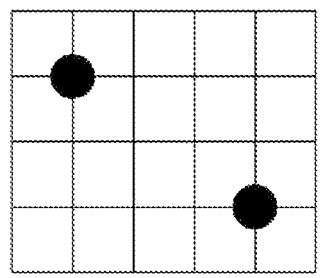
FIG. 6 shows a touch recognition according to an exemplary embodiment of the present invention.

FIG. 2 is a block diagram showing a configuration of the touch controller of FIG. 1. FIG. 3 shows a single touch operation according to an exemplary embodiment of the present invention. FIG. 4 shows a multi-touch operation according to an exemplary embodiment of the present invention. FIG. 5 shows a multi-touch operation according to an exemplary embodiment of the present invention. FIG. 6 shows a touch recognition according to an exemplary embodiment of the present invention.

Referring to FIG. 2, the touch controller 700 includes a driving unit 701, a self capacitance detection unit 703, a mutual capacitance detection unit 705, and a touch recognition unit 707.

Referring to FIG. 2, the driving unit 701 applies the first driving signal to the first electrodes 100 during a first section. Also the driving unit 701 applies the second driving signal to a portion of the second electrodes 200.

The self capacitance detection unit 703 receives the first detection signal from the other end of the at least one first electrode 100. Also the self capacitance detection unit 703 receives the second detection signal from the second electrodes 200 intersecting the at least one first electrode 100 from which the first detection signal is output. The second driving signal is applied to the second electrodes 200, more particularly, the second electrodes 200 operate as the driving electrodes Tx.

The mutual capacitance detection unit 705 receives the third detection signal from the second electrodes 200 intersecting the at least one first electrode 100. Here, the second driving signal is not applied to the second electrodes 200, more particularly, the second electrodes 200 operate as the sensing electrodes Rx.

When at least one first coordinate determined using the first detection signal and the second detection signal do not coincide with at least one second coordinate determined using the third detection signal, the touch recognition unit 707 determines the second coordinate as a touch position.

The touch recognition unit 707 determines whether each of the first coordinate and the second coordinate is one coordinate or two or more coordinates. More particularly, the touch recognition unit 707 determines whether a touch is a single touch as illustrated in FIG. 3, or a multi-touch as illustrated in FIG. 4.

When the touch is determined to be the single touch, the first coordinate is determined as a touch position. More particularly, in the single touch, a highly sensitive touch may be implemented by prioritizing a self capacitance sensing operation.

On the other hand, when the touch is determined to be the multi-touch, the number of first coordinates is compared with the number of second coordinates. When the numbers of the first and second coordinates are the same, the first coordinate is determined as a touch position. When the numbers of the first and second coordinates are not the same, the second coordinate is determined as a touch position. More particularly, the number of touches recognized through self capacitance sensing is compared with the number of touches recognized through mutual capacitance sensing, and when the numbers are the same, the self capacitance sensing operation is prioritized. However, when the numbers are not the same, the mutual capacitance sensing operation is prioritized to prevent occurrence of a ghost point.

In the multi-touch, when the number of first coordinates is the same as the number of second coordinates, the first coordinate determined through the self capacitance sensing having high sensitivity is determined as an effective touch position as illustrated in FIG. 4.

Meanwhile, when the number of first coordinates is not the same as the number of second coordinates, a ghost point may occur during the self capacitance sensing operation as illustrated in FIG. 5. In this case, the touch recognition unit 707 determines the second coordinate determined through the mutual capacitance sensing as an effective touch position. Thus, a ghost point may not occur in a touch coordinate as illustrated in FIG. 6.

Hereinafter, a combined touch sensing operation, i.e., a combined touch sensing operation, in which self capacitance sensing and mutual capacitance sensing are combined, in timing control of the driving unit 701 will be described according to exemplary embodiments of the present invention.

First, a combined touch sensing operation according to an exemplary embodiment of the present invention will be described.

Figure 7:
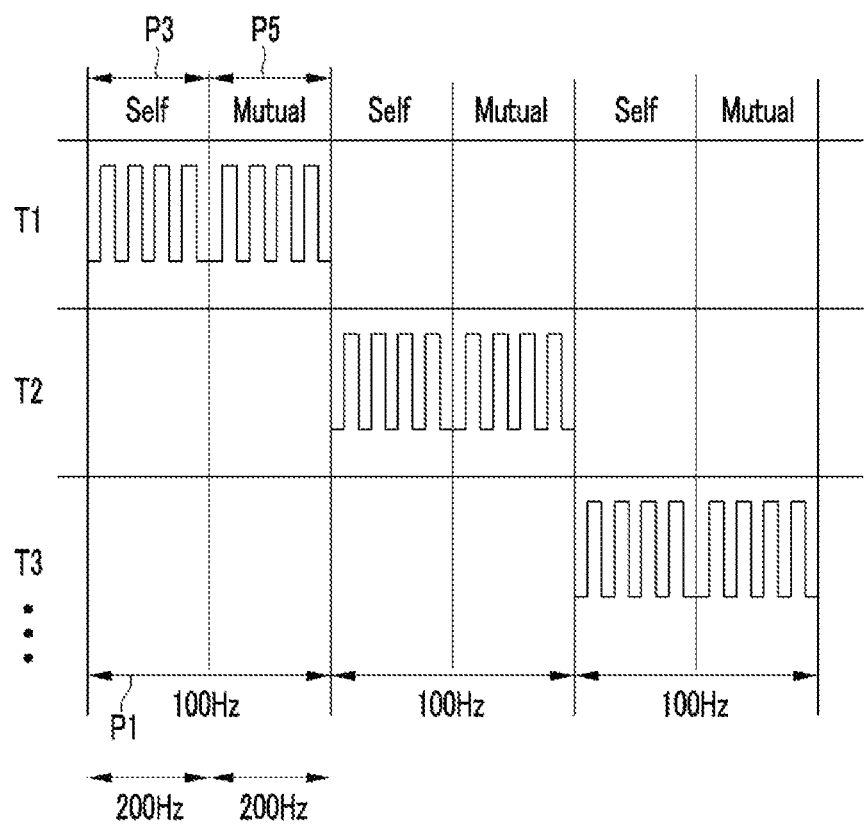
FIG. 7 is a timing view of a first driving signal according to an exemplary embodiment of the present invention.

FIG. 7 is a timing view of a first driving signal according to an exemplary embodiment of the present invention.

Referring to FIG. 7, a first section P1 includes a first pulse signal section P3 for self capacitance sensing and a second pulse signal section P5 for mutual capacitance sensing. A first pulse signal is included in a first driving signal and a second driving signal applied during a self capacitance sensing section. A second pulse signal is included in the first driving signal applied during a mutual capacitance sensing section.

The driving unit 701 sequentially applies the first pulse signal and the second pulse signal to the one ends of the first electrodes 100 during the first pulse signal section P3 and the second pulse signal section P5. At this time, the driving unit 701 drives the first pulse signal and the second pulse signal at 200 Hz and quickly applies the signals.

Figure 8:
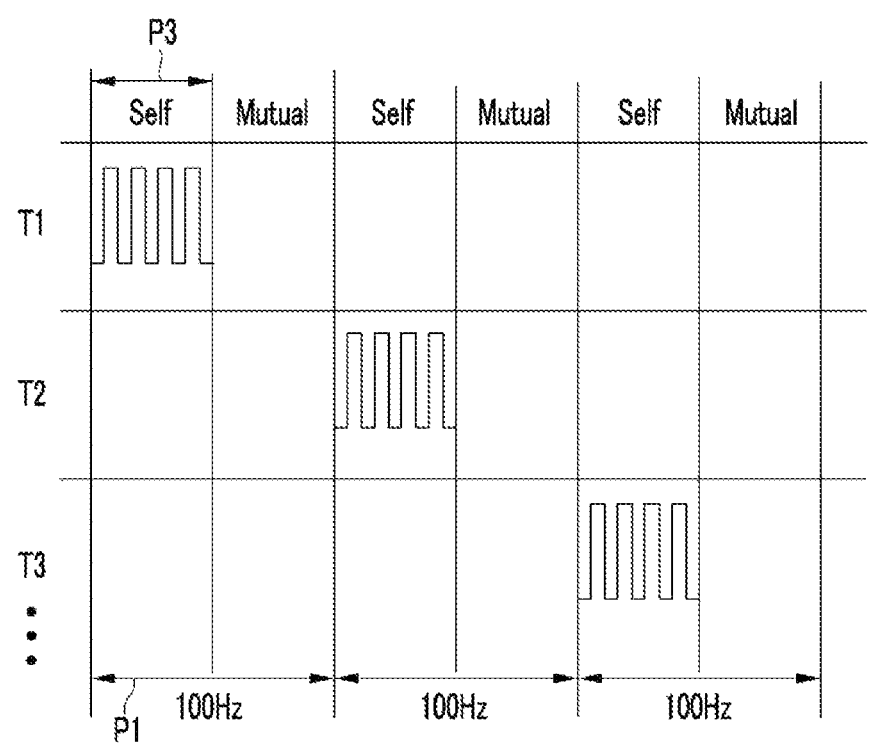
FIG. 8 is a timing view of a second driving signal according to an exemplary embodiment of the present invention.

FIG. 8 is a timing view of a second driving signal according to an exemplary embodiment of the present invention. Referring to FIG. 8, the second driving signal is selectively applied to the one ends of the second electrodes 200 during the first pulse signal section P3 for the self capacitance sensing within the first section P1.

The sensing operation according to the first driving signal and the second driving signal described with reference to FIG. 7 and FIG. 8 will now be described with reference to FIG. 9 and FIG. 10.

Figure 9:
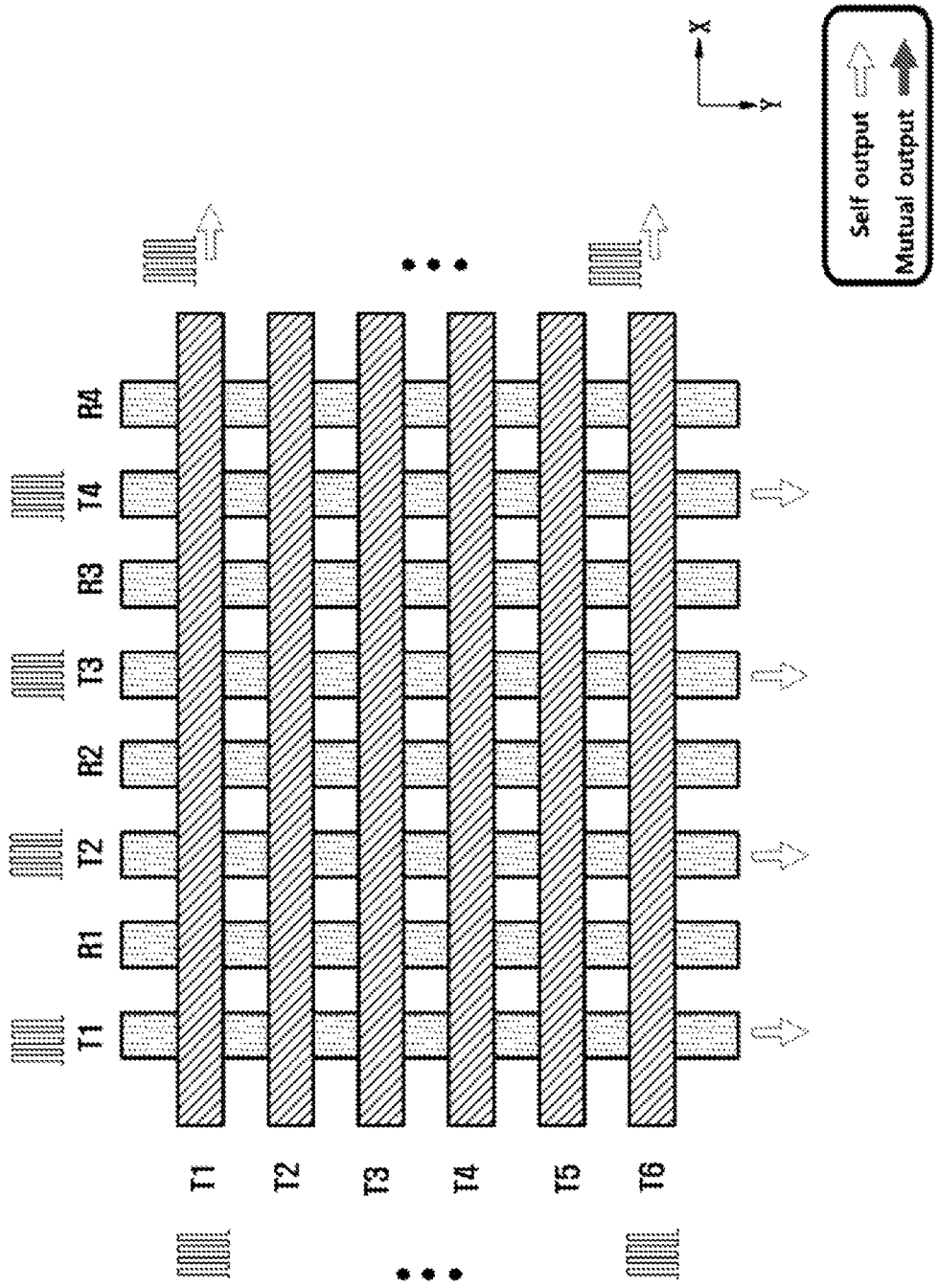
FIG. 9 and FIG. 10 are drawings for describing a combined touch sensing operation according to an exemplary embodiment of the present invention.
Figure 10:
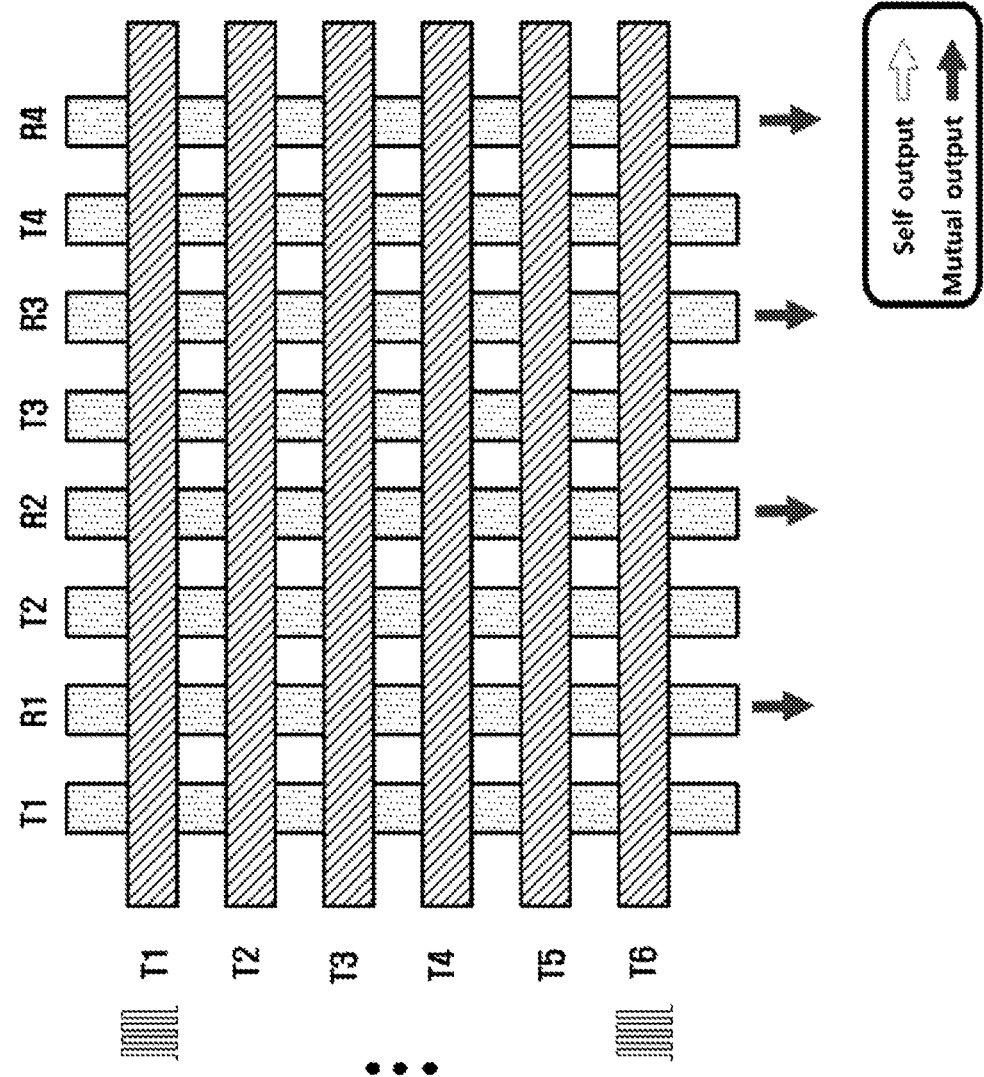

FIG. 9 and FIG. 10 are drawings for describing a combined touch sensing operation according to an exemplary embodiment of the present invention.

Referring to FIG. 9, the first pulse signal of FIG. 4 is applied to first electrodes T1, T2, T3, T4, T5, and T6. Also the first pulse signal of FIG. 4 is applied to a portion of the second electrodes T1, T2, T3, and T4 among the second electrodes. Here, the portion of the second electrodes T1, T2, T3, and T4 operate as driving electrodes Tx.

In this case, the first pulse signal is applied to the first electrodes T1, T2, T3, T4, T5, and T6 and the portion of the second electrodes T1, T2, T3, and T4 at the same time. A first detection signal is output to the other ends of the first electrodes T1, T2, T3, T4, T5, and T6 in the self capacitance sensing section during which the first pulse signal is applied. Also a second detection signal is output from the portion of the second electrodes T1, T2, T3, and T4 operating as the driving electrodes Tx. The first detection signal and the second detection signal correspond to a detection signal Self output according to the self capacitance sensing.

Referring to FIG. 10, after the first pulse signal is applied, the second pulse signal of FIG. 4 is sequentially applied to the first electrodes T1, T2, T3, T4, T4, and T6. Also, as shown in FIG. 8, a signal is not applied to the second electrodes while the second pulse signal of FIG. 7 is applied.

As described above, in the mutual capacitance sensing section during which the second pulse signal is applied, a third detection signal is output from second electrodes R1, R2, R3, and R4 operating as sensing electrodes Rx. The third detection signal corresponds to a detection signal Mutual output according to the mutual capacitance sensing.

A combined touch sensing operation according to an exemplary embodiment of the present invention will be described.

The driving unit 701 may switch the first pulse signal and the second pulse signal and sequentially apply the first and second pulse signals to the one ends of the first electrodes 100 during the first section P1, and may alternately switch the second electrodes 200 to which the first pulse signal is applied during the first section P1. More particularly, each of the first electrodes 100 may alternately perform a self capacitance sensing operation "Self" and a mutual capacitance sensing operation "Mutual".

Figure 11:
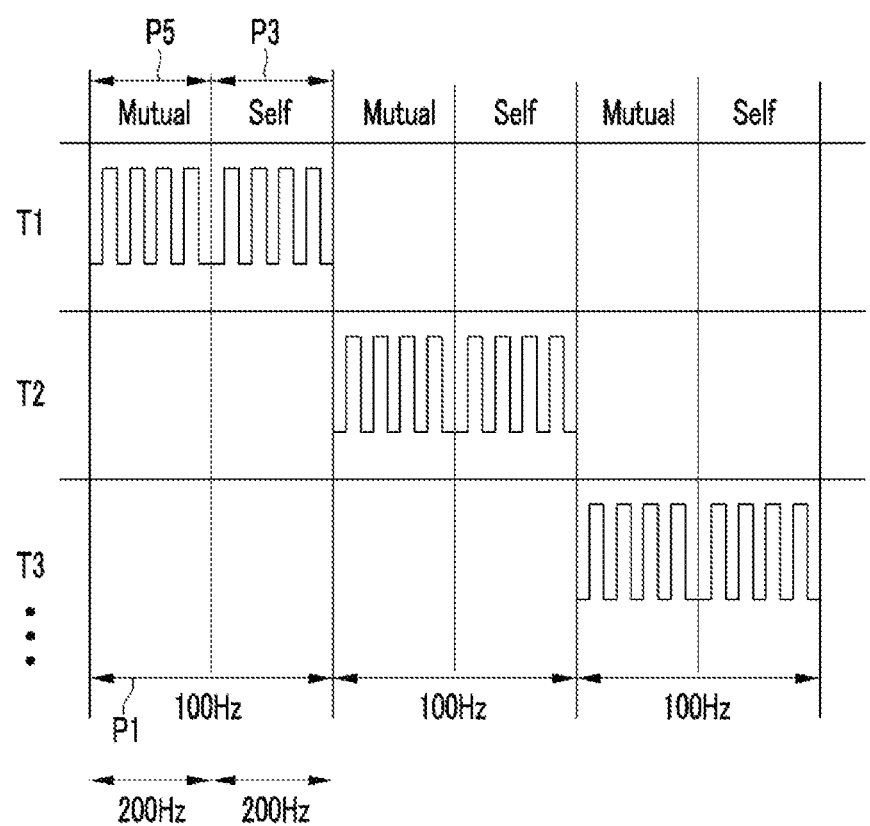
FIG. 11 is a timing view of a first driving signal according to another exemplary embodiment.
Figure 12:
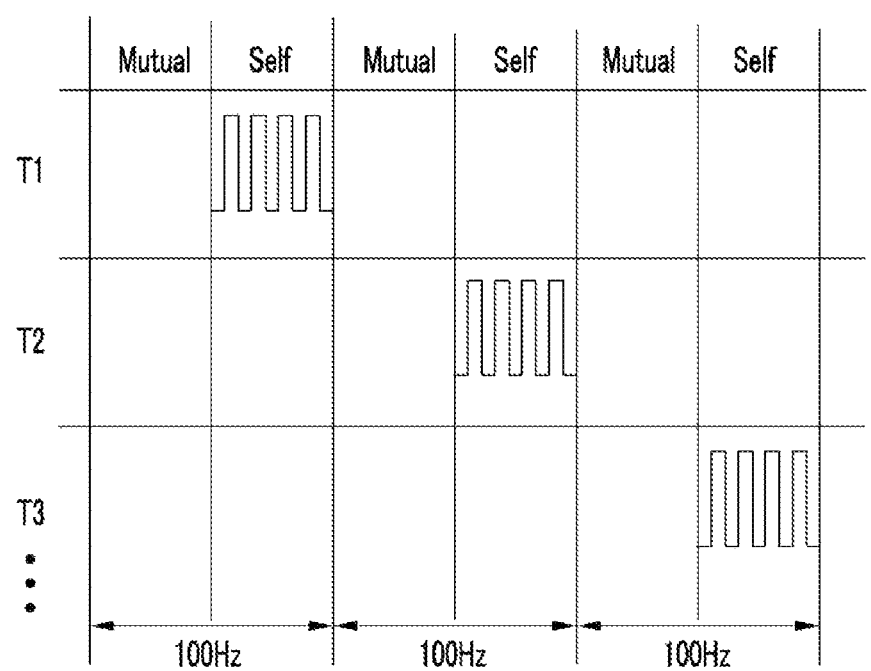
FIG. 12 is an exemplary timing view showing of a second driving signal according to an exemplary embodiment.

FIG. 11 is a timing view of a first driving signal according to an exemplary embodiment of the present invention. FIG. 12 is a timing view of a second driving signal according to an exemplary embodiment of the present invention.

Referring to FIG. 11, as described with reference to FIG. 7, the first section P1 includes the first pulse signal section P3 for the self capacitance sensing and the second pulse signal section P5 for the mutual capacitance sensing. However, the driving unit 701 transfers the second pulse signal and then transfers the first pulse signal.

Referring to FIG. 12, a first pulse signal is applied to a portion of the second electrodes T1, T2 . . . among the second electrodes 200 while the first pulse signal of FIG. 8 is applied.

The sensing operation according to the first driving signal and the second driving signal described with reference to FIG. 11 and FIG. 12 will now be described with reference to FIG. 13 and FIG. 14.

Figure 13:
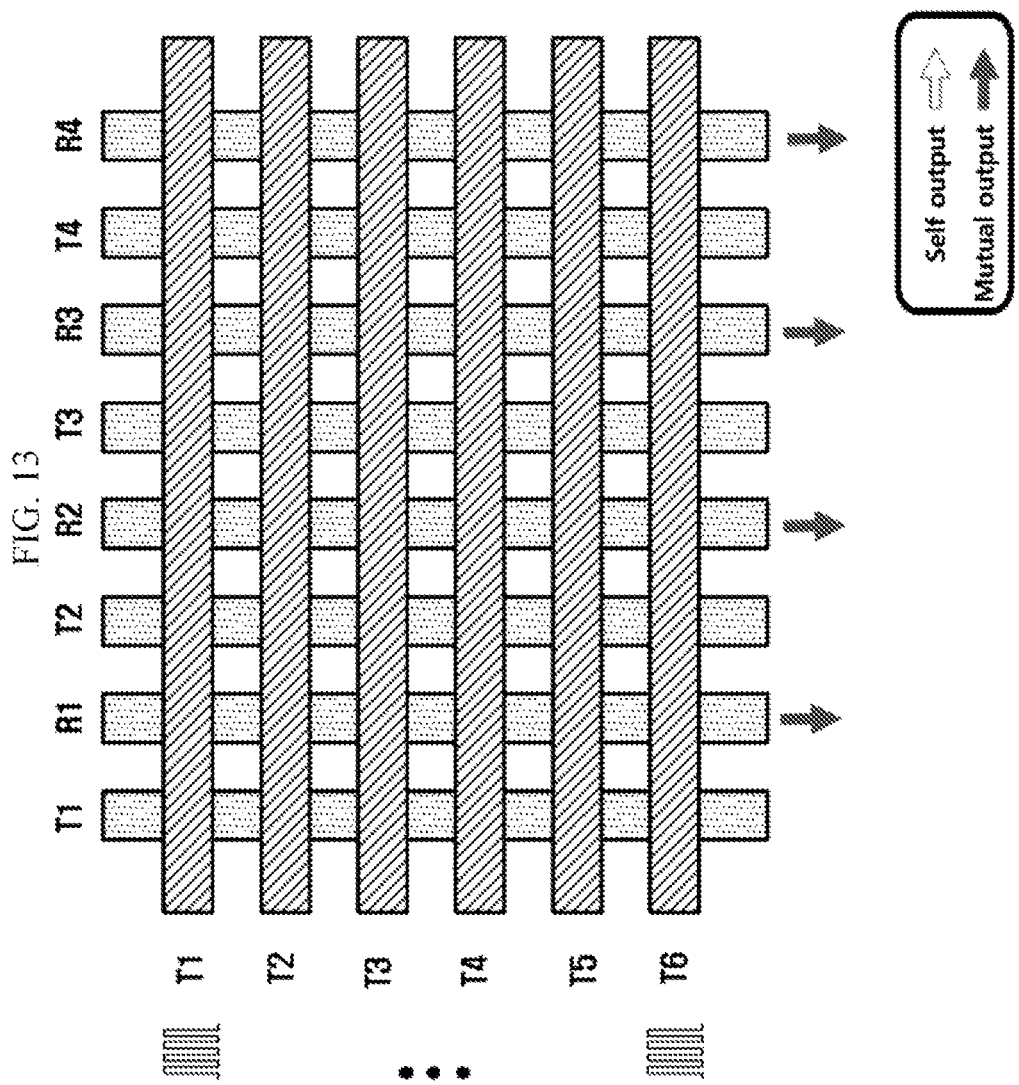
FIG. 13 and FIG. 14 are drawings for describing a combined touch sensing operation according to an exemplary embodiment of the present invention.
Figure 14:
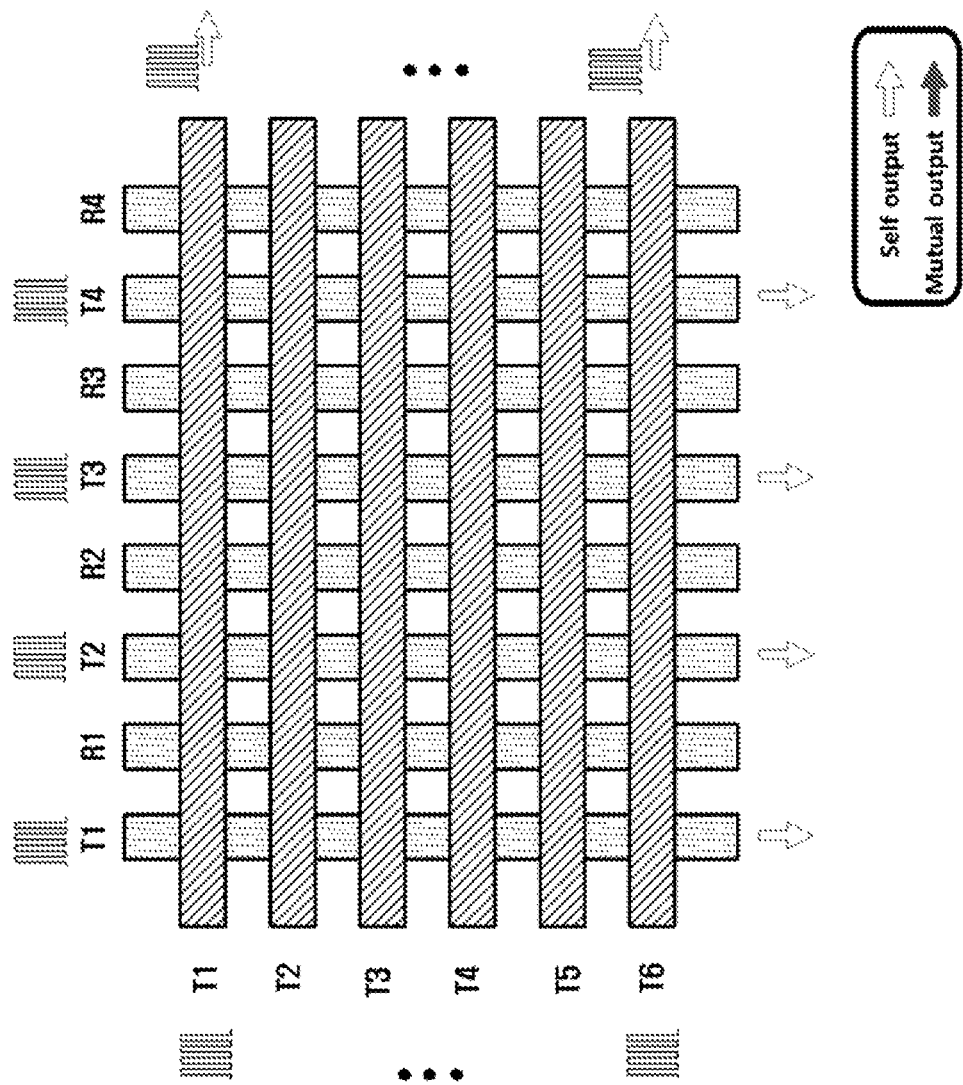

FIG. 13 and FIG. 14 are drawings for describing a combined touch sensing operation according to an exemplary embodiment of the present invention.

Referring to FIG. 13, the second pulse signal of FIG. 11 is applied to the first electrodes T1, T2, T3, T4, T5, and T6. Also, as shown in FIG. 12, a signal is not applied to the second electrodes while the second pulse signal of FIG. 11 is applied.

As described above, in the mutual capacitance sensing section during which the second pulse signal is applied, a third detection signal Mutual output is output from second electrodes R1, R2, R3, and R4 operating as sensing electrodes Rx.

Referring to FIG. 14, after the second pulse signal is applied, the first pulse signal of FIG. 11 is sequentially applied to the first electrodes T1, T2, T3, T4, T5, and T6. Also the first pulse signal of FIG. 12 is applied to the portion of the second electrodes T1, T2, T3 . . . among the second electrodes. Here, the portion of the second electrodes T1, T2, T3 . . . operate as driving electrodes Tx.

At this time, the first pulse signal is applied to the first electrodes T1, T2, T3, T4, T5, and T6 and the portion of the second electrodes T1, T2, T3 . . . at the same time. In the self capacitance sensing section during which the first pulse signal is applied, a first detection signal Self output is output to the other ends of the first electrodes T1, T2, T3, T4, T5, and T6. Also a second detection signal Self output is output from the portion of the second electrodes T1, T2, T3 . . . operating as the driving electrodes Tx.

In addition, the second electrodes 200 include the driving electrodes Tx to which the second driving signal is applied and the sensing electrodes Rx to which the second driving signal is not applied. The second electrodes 200 may alternately operate as driving electrodes Tx and sensing electrodes Rx. More particularly, the second electrodes 200 may alternately perform a self capacitance sensing operation Self and a mutual capacitance sensing operation Mutual according to whether the second driving signal is applied.

Figure 15:
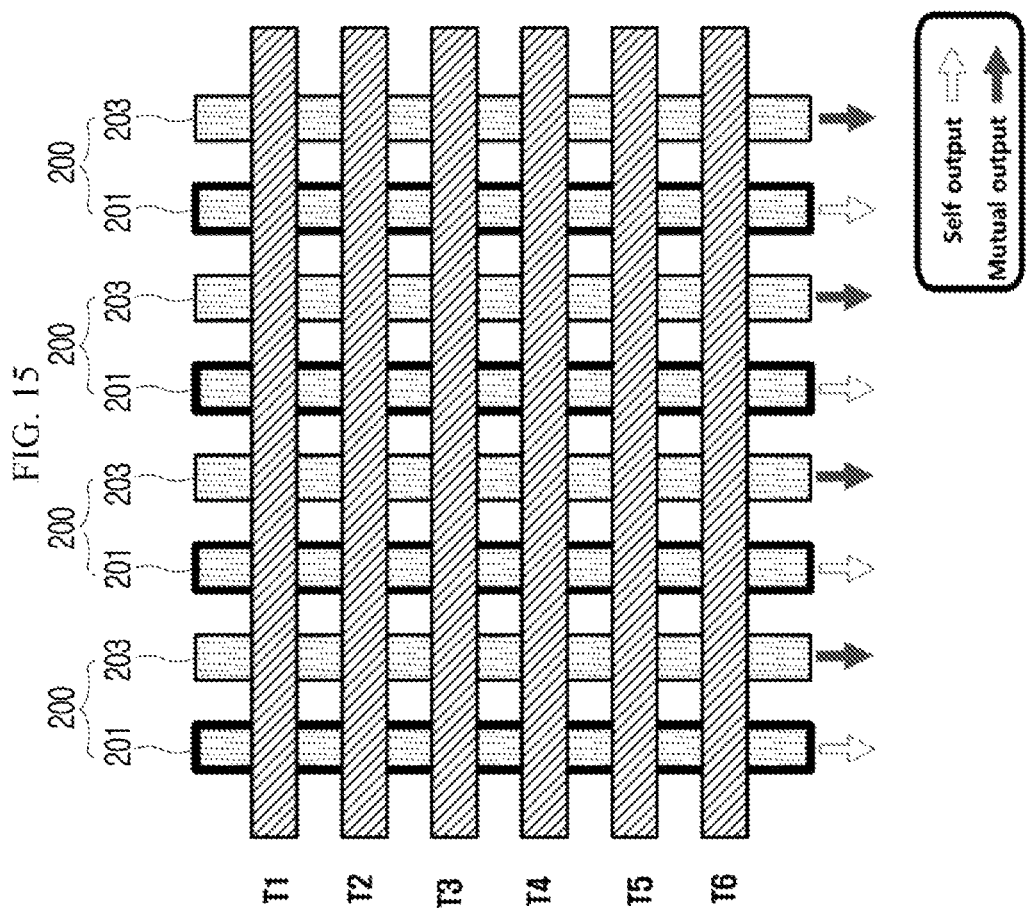
FIG. 15 and FIG. 16 are views of combined touch sensing driving of a second electrode according to an exemplary embodiment of the present invention.
Figure 16:
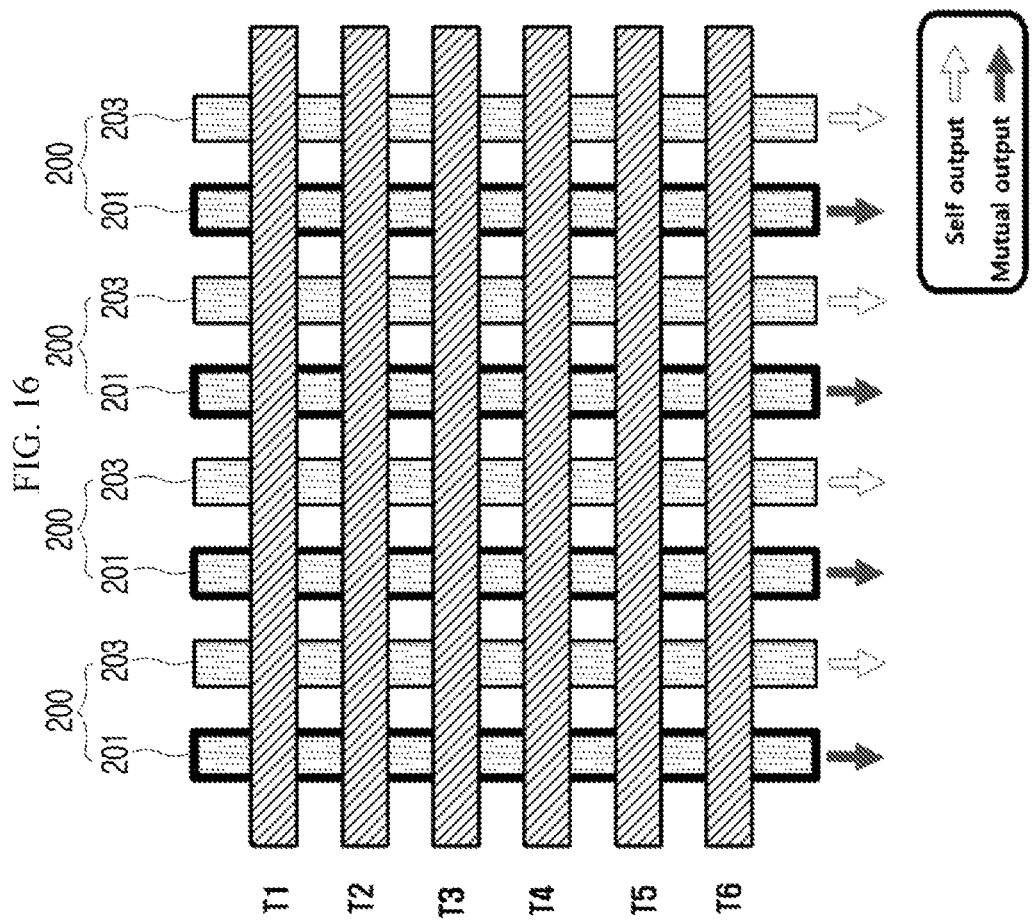

FIG. 15 and FIG. 16 are views of combined touch sensing driving of a second electrode according to an exemplary embodiment of the present invention.

Referring to FIG. 15, 2-1st driving electrodes 201 operate as driving electrodes Tx to which the second driving signal is applied, and 2-2nd driving electrodes 203 operate as sensing electrodes Rx. At this time, the 2-1st driving electrodes 201 output a second detection signal Self output, and the 2-2nd driving electrodes 203 output a third detection signal Mutual output.

Referring to FIG. 16, the 2-1st driving electrodes 201 operate as sensing electrodes Rx, and the 2-2nd driving electrodes 203 operate as driving electrodes Tx to which the second driving signal is applied. At this time, the 2-1st driving electrodes 201 output a third detection signal Mutual output, and the 2-2nd driving electrodes 203 output a second detection signal Self output.

A process of driving a touch device will be described according to an exemplary embodiment of the present invention.

FIG. 17 is a flowchart showing a driving method of a touch device according to an exemplary embodiment of the present invention.

Referring to FIG. 17, the driving unit 701 sequentially applies the first driving signal to the one ends of the first electrodes 100 during the first section P1 (S101).

The driving unit 701 selectively applies the second driving signal to the one ends of the second electrodes 200 during the first section P1 (S103).

The self capacitance detection unit 703 detects the first detection signal from the other end of at least one first electrode 100 to which the first driving signal is applied (S105). Also the self capacitance detection unit 703 detects the second detection signal from the other ends of the second electrodes 200 intersecting at least one first electrode 100 from which the first detection signal is detected. Here, the second driving signal is applied to the second electrodes 200 (S107).

The mutual capacitance detection unit 705 detects the third detection signal from the other ends of the second electrodes 200 intersecting at least one first electrode 100 to which the first driving signal is applied. Here, the second driving signal is not applied to the second electrodes 200 (S109).

The touch recognition unit 707 determines at least one first touch coordinate based on the first detection signal and the second detection signal (S111) and determines at least one second touch coordinate based on the third detection signal (S113).

The touch recognition unit 707 determines whether the at least one first touch coordinate and the at least one second touch coordinate are a single touch or a multi-touch (S115).

When it is determined to be the single touch, the touch recognition unit 707 determines the first touch coordinate as a touch position (S117).

When it is determined to be the multi-touch, the touch recognition unit 707 determines whether the number of first touch coordinates is the same as the number of second touch coordinates (S119).

At this time, when the numbers are the same, the first touch coordinate is determined as a touch position (S121).

When the numbers are not the same, the second touch coordinate is determined as a touch position (S123).

The exemplary embodiments of the present invention may also be implemented through a program for performing functions corresponding to the configuration of the exemplary embodiments of the present invention and a recording medium having the program recorded thereon.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. A touch device, comprising:
a plurality of first electrodes extending in a first direction;
a plurality of second electrodes spaced apart from each other and extending in a second direction intersecting the first direction, the second electrodes comprising a first portion of the second electrodes disposed in an $N^{th}$ row and a second portion of the second electrodes disposed in an $(N+1)^{th}$ row, N being an integer; and
a touch controller configured to:
apply a first pulse signal only to one electrode of the first electrodes and one electrode of the first portion of the second electrodes during a first period, and detect self capacitance of the one electrode of the first electrodes and self capacitance of the one electrode of the first portion of the second electrodes according to sensing signals received from the one electrode of the first electrodes and the one electrode of the first portion of the second electrodes during the first period;
after the first period, apply a second pulse signal only to the one electrode of the first electrodes during a second period, and detect mutual capacitances between the one electrode of the first electrodes and the second portion of the second electrodes intersecting the one electrode of the first electrodes according to sensing signals received from the second portion of the second electrodes during the second period;
after the second period, apply the first pulse signal only to a next one electrode of the first electrodes and a next one electrode of the first portion of the second electrodes during a next first period, and detect self capacitance of the next one electrode of the first electrodes and self capacitance of the next one electrode of the first portion of the second electrodes according to sensing signals received from the next one electrode of the first electrodes and the next one electrode of the first portion of the second electrodes during the next first period; and
after the next first period, apply the second pulse signal only to the next one electrode of the first electrodes during a next second period, and detect mutual capacitances between the next one electrode of the first electrodes and the second portion of the second electrodes intersecting the next one electrode of the first electrodes according to sensing signals received from the second portion of the second electrodes during the next second period.

2. The touch device of claim 1, wherein the touch controller comprises:
a self capacitance detection unit configured to receive a first detection signal from a second end of the at least one of the first electrodes and receive a second detection signal from the first portion of the second electrodes;
a mutual capacitance detection unit configured to receive a third detection signal from the second portion of the second electrodes; and
a touch recognition unit configured to determine a second coordinate as a touch position when at least one first coordinate determined using the first detection signal and the second detection signal does not coincide with at least one second coordinate determined using the third detection signal.

3. The touch device of claim 2, wherein the touch recognition unit is configured to:
determine whether a touch is a single touch or a multi-touch based on the first detection signal, the second detection signal, and the third detection signal;
compare the number of first coordinates with the number of second coordinates when the touch is determined to be the multi-touch;
determine the first coordinate as the touch position when the numbers of the first and second coordinates are the same; and
determine the second coordinate as the touch position when the numbers of the first and second coordinates are not the same.

4. The touch device of claim 3, wherein the touch recognition unit is configured to determine the first coordinate as the touch position when the touch is determined to be the single touch.

5. The touch device of claim 2, wherein:
the self capacitance detection unit is configured to receive the first detection signal and the second detection signal while the first pulse signal is supplied; and
the mutual capacitance detection unit is configured to receive the third detection signal while the second pulse signal is supplied.

6. The touch device of claim 1, wherein the driving unit is configured to:
switch the first pulse signal and the second pulse signal;
sequentially apply the first and second pulse signals to the first ends of the first electrodes during the first section; and
alternately switch the second electrodes to which the first pulse signal is applied during the first section.

7. The touch device of claim 1, wherein the first portion and the second portion of the second electrodes are alternately disposed with one another.

8. A driving method of a touch device comprising a plurality of first electrodes extending in a first direction, a plurality of second electrodes spaced apart from each other and extending in a second direction intersecting the first direction, the second electrodes comprising a first portion of the second electrodes disposed in an $N^{th}$ row and a second portion of the second electrodes disposed in an $(N+1)^{th}$ row, N being an integer, and a touch controller configured to detect a touch by detecting capacitances of the first electrodes and the second electrodes, the driving method comprising:
apply a first pulse signal only to one electrode of the first electrodes and one electrode of the first portion of the second electrodes during a first period, and detect self capacitance of the one electrode of the first electrodes and self capacitance of the one electrode of the first portion of the second electrodes according to a first sensing signal received from the one electrode of the first electrodes and a second sensing signal received from the one electrode of the first portion of the second electrodes during the first period;
after the first period, apply a second pulse signal only to the one electrode of the first electrodes during a second period, and detect mutual capacitances between the one electrode of the first electrodes and the second portion of the second electrodes intersecting the one electrode of the first electrodes according to a third sensing signal received from the second portion of the second electrodes during the second period;
after the second period, apply the first pulse signal only to a next one electrode of the first electrodes and a next one electrode of the first portion of the second electrodes during a next first period, and detect self capacitance of the next one electrode of the first electrodes and self capacitance of the next one electrode of the first portion of the second electrodes according to sensing signals received from the next one electrode of the first electrodes and the next one electrode of the first portion of the second electrodes during the next first period; and
after the next first period, apply the second pulse signal only to the next one electrode of the first electrodes during a next second period, and detect mutual capacitances between the next one electrode of the first electrodes and the second portion of the second electrodes intersecting the next one electrode of the first electrodes according to sensing signals received from the second portion of the second electrodes during the next second period.

9. The driving method of claim 8, wherein:
detecting of the self capacitances comprises receiving the first detection signal from the a second end of the at least one of the first electrodes and receiving the second detection signal from the first portion of the second electrodes;
detecting of the mutual capacitances comprises receiving the third detection signal from the second portion of the second electrodes; and
the driving method further comprises detecting a touch position using at least one first coordinate determined using the first detection signal and the second detection signal and at least one second coordinate determined using the third detection signal, after detecting of the mutual capacitances.

10. The driving method of claim 9, wherein recognizing of the touch position comprises:
determining whether a touch is a single touch or a multi-touch based on the first detection signal, the second detection signal, and the third detection signal;
determining the first coordinate determined using the first detection signal and the second detection signal as the touch position when the touch is determined to be the single touch, and
determining the touch position based on a comparison result of first coordinates to second coordinates when the touch is determined to be the multi-touch.

11. The driving method of claim 10, wherein determining of the touch position based on the comparison result comprises:
comparing the number of the first coordinates with the number of the second coordinates to determine whether the numbers are the same;
determining the first coordinate as the touch position when the numbers are the same; and
determining the second coordinate as the touch position when the numbers are not the same.

12. The driving method of claim 8, wherein:
sequentially applying of the first pulse signal and the second pulse signal comprises alternately switching an order of the first pulse signal and the second pulse signal and sequentially applying the first pulse signal and the second pulse signal; and
applying of the first pulse signal during the first section comprises alternately switching the second electrodes to which the first pulse signal is applied to apply the first pulse signal to the second electrodes among the second electrodes.

13. The driving method of claim 12, wherein:
the first portion of the second electrodes comprises a driving electrode Tx; and
the second portion of the second electrodes comprises a sensing electrode Rx.

14. The touch device of claim 8, wherein:
the first portion of the second electrodes comprises a driving electrode Tx; and
the second portion of the second electrodes comprises a sensing electrode Rx.

15. The driving method of claim 8, wherein the first portion and the second portion of the second electrodes are alternately disposed with one another.

* * * * *